United States Patent
Dalton et al.

(10) Patent No.: US 9,170,916 B2
(45) Date of Patent: Oct. 27, 2015

(54) POWER PROFILING AND AUDITING CONSUMPTION SYSTEMS AND METHODS

(76) Inventors: Damian Dalton, Ballinteer (IE); Abhay Vadher, Dun Laoghaire (GB); Andrew McCarthy, Athy (IE); Christian Steger, Graz (AT)

( * ) Notice: Subject to any disclaimer, the term of this patent is extended or adjusted under 35 U.S.C. 154(b) by 742 days.

(21) Appl. No.: 13/180,152

(22) Filed: Jul. 11, 2011

(65) Prior Publication Data

US 2012/0011378 A1  Jan. 12, 2012

Related U.S. Application Data

(60) Provisional application No. 61/454,741, filed on Mar. 21, 2011.

(30) Foreign Application Priority Data

Jul. 9, 2010 (IE) .................................... 2010/0424

(51) Int. Cl.
| | |
|---|---|
| G06F 1/00 | (2006.01) |
| G01R 21/00 | (2006.01) |
| G06F 11/34 | (2006.01) |
| G06F 11/30 | (2006.01) |
| G06F 11/32 | (2006.01) |

(52) U.S. Cl.
CPC ........ G06F 11/3447 (2013.01); G06F 11/3062 (2013.01); G06F 11/328 (2013.01); G06F 11/3428 (2013.01); G06F 11/3466 (2013.01); G06F 2201/815 (2013.01); Y02B 60/165 (2013.01)

(58) Field of Classification Search
USPC .................................................. 713/300, 340
See application file for complete search history.

(56) References Cited

U.S. PATENT DOCUMENTS

| | | | | |
|---|---|---|---|---|
| 6,925,573 | B2* | 8/2005 | Bodas ........................... | 713/320 |
| 6,928,564 | B2* | 8/2005 | Tada et al. ..................... | 713/321 |
| 7,200,763 | B2* | 4/2007 | Williams ....................... | 713/320 |
| 7,349,828 | B1* | 3/2008 | Ranganathan et al. ........ | 702/186 |
| 7,536,567 | B2* | 5/2009 | Bonola et al. ................. | 713/300 |
| 7,971,078 | B2* | 6/2011 | Govindan et al. ............. | 713/300 |
| 8,225,119 | B2* | 7/2012 | Jain et al. ...................... | 713/320 |
| 2009/0198385 | A1* | 8/2009 | Oe et al. ........................ | 700/296 |
| 2010/0312874 | A1* | 12/2010 | Jansen et al. .................. | 709/224 |
| 2010/0325454 | A1* | 12/2010 | Parthasarathy ............... | 713/320 |
| 2011/0191609 | A1* | 8/2011 | Van Bokhoven et al. ..... | 713/310 |
| 2011/0213997 | A1* | 9/2011 | Kansal et al. ................. | 713/324 |
| 2011/0231320 | A1* | 9/2011 | Irving ............................ | 705/80 |
| 2011/0264418 | A1* | 10/2011 | Szewczyk et al. ............. | 703/2 |

* cited by examiner

*Primary Examiner* — Mark Connolly
(74) *Attorney, Agent, or Firm* — Loza & Loza LLP; Anthony G. Smyth

(57) ABSTRACT

Systems and methods for estimating power consumption in a network of computing devices are described. Operational information of a target server is periodically received and compared to benchmark data of a model of the target server. The operational information comprises performance data of the target server during a predefined time interval. Power consumption of the target server is estimated using the performance and benchmark data. The benchmark data is recalibrated if an error in the estimated power consumption is detected. An agent installed on the target server for collecting performance data is described. The target server can be a virtualized server, in which case, the agent acquires at least some of the performance data from a hypervisor of a physical server that hosts the target server.

20 Claims, 8 Drawing Sheets

POWER PROFILING AND AUDITING CONSUMPTION SYSTEMS AND METHODS

CROSS-REFERENCE TO RELATED APPLICATIONS

The present Application claims priority from Irish Patent Application No. 2010/0424, filed Jul. 9, 2010, and from U.S. Provisional Patent Application No. 61/454,741 filed Mar. 21, 2011, and both of these applications are expressly incorporated by reference herein for all purposes.

BACKGROUND OF THE INVENTION

1. Field of the Invention

The present invention relates generally to power management and more particularly to power usage estimation and monitoring systems.

2. Description of Related Art

Power consumption of servers, memory devices and network equipment is a major issue of concern in the design and operation of data centers. Apart from consuming electrical power, servers and associated equipment must be cooled to ensure that they operate in the envelope of conditions for which they have been designed. Operating outside this envelope reduces the life-span and increases the failure rate of these devices. For every 2 dollars spent powering a server, typically 1 dollar is spent cooling it. Consequently increasing server power efficiency, reduces consumption and the costs of cooling.

Conventional systems employ methods for power estimation that compare real-time data obtained from sensors in a monitored electrical system with data generated by a predictive modeled virtual system. If a predicted value of some electrical or physical entity is outside a set value or an alarm condition value, a re-calibration of the system is generated utilizing mathematical equations with the new real-time data, However, such systems tend to have limited application and are used mainly for monitoring electrical power consumption in large complex networks such as factories, processing plants, ships, etc. However, such conventional systems often cannot cope with electrical systems of a much smaller scale such as electronic systems due to the substantially smaller size. Additionally, the greater variances between different instances of these small systems render it economically and difficult, if not impossible, to install meters into the systems, Although severs are becoming more power efficient, they are also getting smaller, for example Blade-servers. Consequently, the power density, the amount of electrical power that must be concentrated in a given area of the data center, is increasing. The implications for the data center are increased power demand per unit area of data center space, and a greater cooling capacity requirement.

Another unaddressed problem in data centers arises when servers are being installed in a rack system. Each rack must be adequately provisioned for power, otherwise the power unit supplying a rack may be insufficient. Overestimating the power consumption of servers in a rack, can result in the selection of an inappropriate power unit which is not power efficient, or under-utilization of the rack system capacity. Underestimating the server power demand can result in power failure for the rack. Conventional systems cannot accurately determine the server power demand in a rack without significant increased complexity and cost.

Data centers also operate under a complex range of electricity tariffs, Failure by a center to operate in a predicted, narrow window of power consumption can incur severe financial penalties. Thus, centers have a need to accurately predict future power demands.

Power measurement in data centers is traditionally performed at the rack-level, using a power meter integrated in the PDU (Power Distribution Unit) supplying power to the rack. Alternatively, a meter is externally connected to the supply line of the rack. However, this approach can, at most, achieve only a rack-level power resolution, as it is not possible to determine the power consumption of the individual servers. Another approach uses a radio-transmitter device which measures power through a sensor located around the server power cable. This, and other approaches, incur significantly increased expenses and complexity. Indeed, all of these conventional methods involve physical sensors and have intrinsic limitations when deployed across a population of several thousand servers.

The cost of power meters ranges from $100's to $1000's, Complexity is increased due to the mass of physical wires required to power and connect the meters, and the large number of communication channels or signals. Significantly, it is not possible/practical to determine the power consumption of the individual processes and applications executed on an individual server using external measuring devices. Because dynamic scheduling and execution of multiple processes occurs in micro-second time frames on the server, it is impossible to synchronize the measurement of these activities with an external physical meter.

Conventional power estimation systems are further limited because most of these systems assume a power model that is linear for CPU and memory usage and for network I/O activity. These conventional models are generated using measurements of server power consumption, while executing a series of benchmarks. Linear interpolation is used to obtain a best-fit linear equation which is thought to describe the server's power behavior. However, such equations are naive and produce results which can have an average error of at least 5% and which often deliver results which are 25% or more in error. Because of this level of inaccuracy, these conventional systems cannot be used for billing purposes related to power consumption in most countries, because they fall below the standards required by laws regulating the accuracy of meters used for billing utilities.

BRIEF SUMMARY OF THE INVENTION

Certain embodiments of the invention comprise software systems that can be installed in a server network and provide non-intrusive mechanisms (i.e. no extra hardware is required on the computer) for monitoring power consumption while the servers are operating. Software daemons installed on each target server monitor various parameters through the operating system ("O/S"). The value of these parameters may be sampled and/or monitored at the end of a designated time period by the daemons through a series of system calls, typically to one or more O/S functions. These parameters can be used as input variables for various mathematical models describing the power and energy behavior of each respective target server. The target servers act as clients in the overall system and periodically transmit packets containing measured and configured parameters to a monitoring server ("Master Server") that is often considered a central server. Parameters may have been measured over a designated period of time at each from each individual target server to a Master Server. The Master Server typically maintains power models for each server type in the network and, using these models in conjunction with the parameters that have been received from the target servers, the Master Server can compute an estimate of the power and energy consumption of each individual target server over the designated time period. The power and energy information for all target servers is stored in database so that extensive analysis can be prepared for every server over an extended period of time.

Certain embodiments of the invention permit accurate determination of server power demand in a rack, thereby facilitating the maximum utilization of the data center resources and circumventing certain issues arising from underestimation server power demand. These issues can result in power failure for the rack.

Certain embodiments of the invention resolve problems observable in conventional systems by enabling proper energy and power management of a data-center by providing systems and methods that provide accurate and detailed power measurement. With adequate power monitoring, power issues can be identified and quantified, and an informed series of strategies devised to tackle them. The effectiveness of such the strategies can easily be assessed. Further measures to reduce power and costs can be introduced. The operational cost of servers and equipment can be determined and their true total cost of ownership (TOO) ascertained. The cost of running the same application executing on different servers with the same workload, can be investigated. Applications can then be migrated onto the server which offers the best cost/performance metric.

Moreover, certain embodiments of the invention inform choice when a data center is being upgraded. The most efficient servers and equipment can be chosen based on real, historic data, and the required capacity of all support systems accurately estimated. A wider range of power saving actions are available because power monitoring of the servers can be performed in real-time rather than being limited to analysis of power logs that are generated over a period of time. Because power information can be readily and timely acquired, immediate action can be taken to direct cooling to specific hot-spots along with other automated responses, thereby preventing adverse operating conditions and maintain optimal performance.

Certain embodiments of the invention measures power consumption of individual servers in a network or data-center environment, as well as the applications or processes executed on the servers. A non-intrusive, agent-based system requires no additional hardware such as meters and wiring. Software, mathematical techniques, and power models are constructed, assembled, and/or customized as required for each server type. These models are typically based on O/S and system-level parameters extractable during the operation of the server, and are more accurate than conventional linear power models.

On each target server that is monitored, an agent is installed which periodically transmits the data to a designated master server. These clients act as virtual meters. The master server calculates the power consumption of the server using its associated power model. The data may also comprise information that allows the master server to determine which processes have executed and the power that they have consumed. Process and power information is stored in a data-base on the master, where it can be further analyzed through GUI's and report generation tools. The method can be applied to virtualized server systems, and power can be traced to individual virtual machines and their applications. Other data-center devices and equipment such as SAN, NAS and RAID memory systems can also be modeled by this method using their SNMP interface or the same TCP/IP communication method as used in the client and master server system.

DETAILED DESCRIPTION OF THE INVENTION

Figure 1:
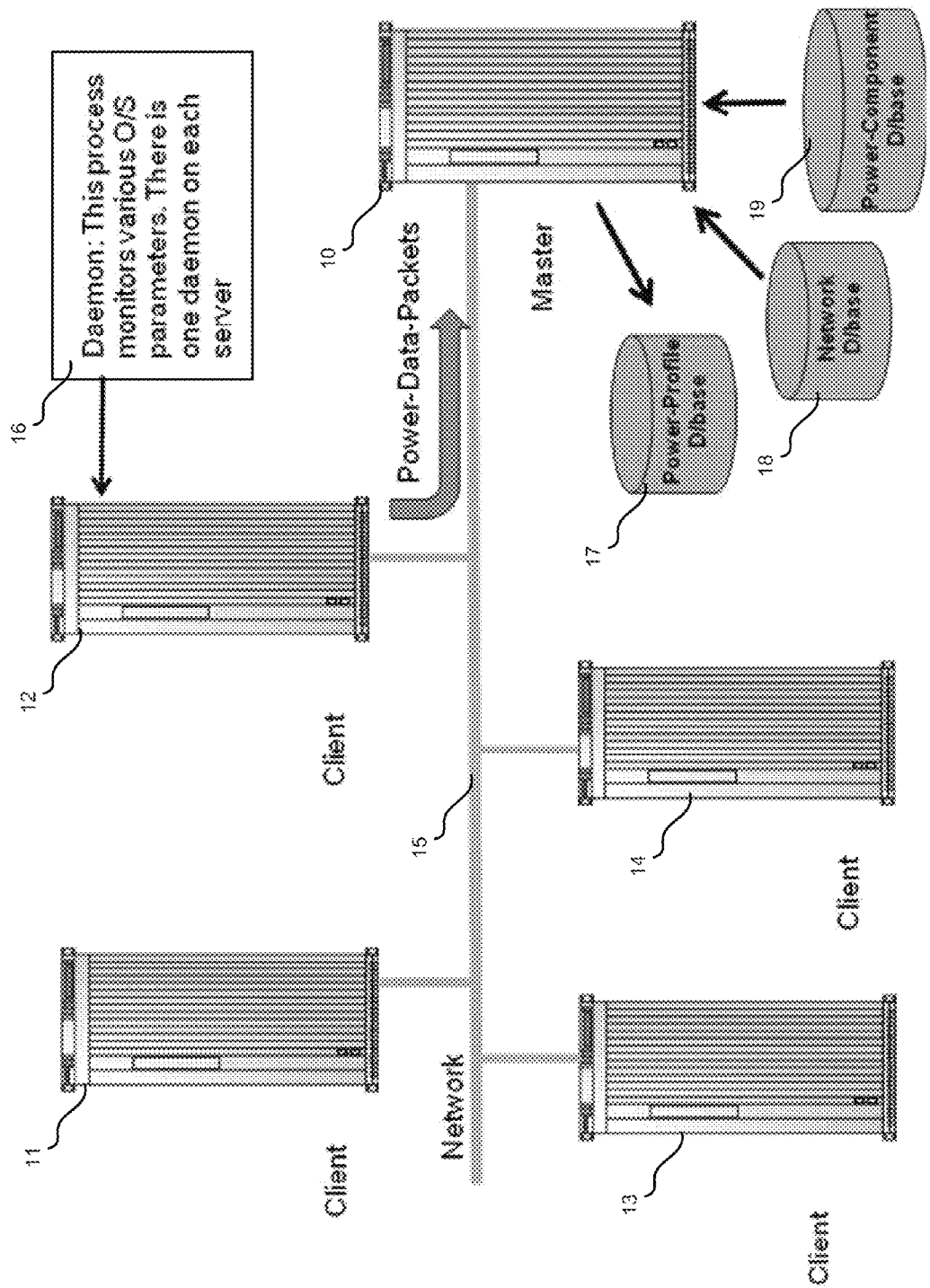
FIG. 1 is a simplified schematic diagram illustrating certain aspects of the invention.

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the components referred to herein by way of illustration. For example, the systems described are limited in size for the purpose of description only and the techniques, processes and methods can easily be scaled to cover very large and/or complex electrical systems.

Certain embodiments of the invention provide systems and methods for monitoring power consumption of networked servers while the servers are operating. While certain embodiments may be implemented using a combination of external measurement devices, self-contained semiconductor devices and software that controls operations of these devices, certain embodiments of the invention comprise software components that may be executed by one or more servers and that take advantage of native capabilities of the one or more servers. According to certain aspects of the invention, software can be installed in a server network and may provide a non-intrusive, or substantially non-intrusive mechanism for monitoring power consumption while the servers are operating.

A mechanism may be considered to be non-intrusive if it requires no extra hardware is on a computer for operation. Non-intrusiveness can also be quantified by measuring the percentage of processor time used by the mechanism and/or the amount of memory used by software installed on the computer. For example, software that requires less than 1% of processing time or system storage may be considered to be substantially non-intrusive; many embodiments of the present invention can achieve significantly lower processor usage, to a point where the processor time used is barely measurable.

Referring to FIG. 1, certain aspects of the invention relate to a plurality of servers 10-14 connected by a network 15. In certain embodiments, software daemons 16 are installed on each of a plurality of servers (server 12 illustrated) to monitor various parameters that are accessible through an O/S controlling a device 10-14 being monitored. An O/S may include software that comprises programs and data that run on a computer in order to manage computer resources, including allocation of memory and processing time between application programs and system programs and services. The O/S typically provides common services for execution of application software and provides communications and user interfaces.

Daemons 16 provided according to certain aspects of the invention may monitor values of certain parameters periodically; for example, the parameters may be measured and/or updated at the end of a designated time period. The measurements can be acquired by the daemons 16 through a series of system calls to various O/S functions. Certain parameters may be published in a registry or system tables populated by the O/S or other software, such as device drivers, exception handlers, and the like. The measured parameters can be used as input variables for mathematical models used to describe the power and energy behavior of each respective server 10-14.

In certain embodiments, a plurality of servers 10-14 includes a Master Server 10 and target servers 11-14 that report measurements to the Master Server 10. Herein, Master Server 10 may also be referred to as a Master 10 or a primary server 10 and target servers 11-14 may also be referred to as targets 11-14 or clients 11-14. In certain embodiments, daemons 16, other software, configuration information and other data may be provided to target servers 11-14 packaged in an agent that can be installed and executed on the target servers 11-14.

In certain embodiments, target servers 11-14 act as clients in the system and may periodically transmit parameters that have been measured over a designated period of time from each individual target server 11, 12, 13, or 14 to a designated Master Server 10. The parameters may be transmitted in a packet and the Master Server 10 typically maintains a database 17 or other listing of power models for each type and/or configuration of server found in the network. The Master Server 10 assigns and uses an appropriate model for each of target servers 11-14 to compute the power and energy consumption of the target server 11, 12, 13, 01 14 using parameters that have been received from the target server 11, 12, 13, or 14 over a predetermined or configured time period.

Power and energy information for some or all of the target servers 11-14 can be aggregated and/or stored in one or more database 17-19 for more extensive analysis. Such extensive analysis can be used to adapt server models and can further be used on an individual basis to characterize the operation of each target server 11-14 in the network or in a group of servers. It will be appreciated that an agent may also be installed on the Master Server 10, enabling it to perform as a target server and collect information about its own power consumption.

Server Power Model

In certain embodiments of the invention, mathematical power models are generated for each distinct server type. A server type may be defined by a set of physical components within the server, where the physical components contribute significantly to its power consumption. Thus a server type may be defined by its manufacturer, processor type and frequency, memory structure and size, and network input/output hardware and other attributes and attached devices. Typically, one model is maintained for each server type although it is contemplated that variants may be developed based on measured operational characteristics and elemental differences in server construction. Model variants may be maintained as a set of offsets and deviations relative to a base server model. Model variants may account for dynamically configurable operational aspects of a server where, for example, the server may control one or more system clocks and/or speed of operation of processors and other devices. Model variants may account for environmental conditions where, for example, the ambient temperature may vary with resulting changes in power consumption, whether due to changes in current flowing in semiconductor devices and/or increased power consumption for cooling systems.

In one example, a power model can comprise a table of entries of measured server parameters and their corresponding measured power consumption. The simplified example of Table 1 illustrates one entry in a power model comprising a table of measured parameter values (Inputs) and the corresponding Energy and Power Values (Outputs).

TABLE 1

| Input Parameters | | | Output Values | |
|---|---|---|---|---|
| Parameter 1 CPU Usage | Parameter 2 Disk activity | Parameter 3 Network activity | Power Value Watts | Energy Value Joules (KwH) |
| 0.73 | 0.22 | 0.78 | 3.4 | $3.4 \times 10^{-3}$ Entry |

The table may be used to calculate an estimate of power consumption for the server in real-time using sampled parameter values. For example, the nearest entries in the table to the sampled values can be used as a basis for the estimate of power and calculation of energy consumption.

In certain embodiments a model may be created and/or updated using a power meter to measure power and energy consumption of a server over fixed periods of time. Within each period, certain system-level parameters are monitored, including processor usage (e.g. central processing unit ("CPU") usage), disk activity and network activity. The system level parameters can be correlated with measurements obtained from the power meter and power usage for each system component and server activity can be characterized based on the correlation.

System-level data can be acquired using system calls and/or other standard functions provided by the O/S. A sampling period is typically defined for monitoring target server performance and, at the end of each period, system-level parameters may be measured simultaneously with the power and energy consumption measured by a power/energy meter. The sampling period may be selected based on anticipated or observed operational characteristics of the monitored system. The sampling period is typically short enough to permit capture of oscillations in power usage. The sampling period is typically long enough to have a negligible impact on system performance. Accordingly, sampling periods can be measured in microseconds, milliseconds, seconds or minutes; in some systems longer periods are usable. In certain embodiments, the sampling period may be dynamically varied based on observed operational characteristics, changes in system performance, changes in power consumption and/or upon detection of error conditions in the measured system or the monitoring subsystems described herein.

Parameters, energy and power values may be used to update information recorded in a model-file. In certain embodiments, the operating status of the processor may also be recorded in order to establish if, for instance, the processor was operating in idle, active or dormant state when the measurements were made. For some advanced servers it may be also necessary to record additional parameters such as the cache hit/miss rate in order to produce a model that has less than 2% error between model prediction and measured value.

The input parameters used in the generation of a power model may comprise CPU usage measured as the percentage of time that the processor is active, disk activity measured as bytes transferred per second, and network activity measured as bits transmitted or received every second. These parameters measured at each time period may be normalized but for use in the power model. For example, the parameters may be scaled to have a value that lies between 0 and 1. It will be appreciated that the normalization process requires a determination of the maximum value for each parameter, this maximum value being used as denominator that divides all measured values of the parameter. Accordingly, certain embodiments maintain a power model that comprises an indexed table of normalized parameters. A set of parameters defines a row which is an entry in the table, where the row corresponds to set of parameters that were recorded in the model-file for a particular time period, which have been normalized, and the corresponding power and energy values that were measured by the meter (see Table 1). In certain embodiments the table can be augmented with additional non-numeric input parameters detailing the mode of operation (idle, active dormant etc.) and/or other normalized numeric parameters such as cache miss/hit activity.

In certain embodiments, a series of benchmarks are executed on the server while power and energy values are monitored by the meter in order to produce the entries for the power model. Typically, the server is extensively exercised by the benchmarks so that a model is produced that is sufficiently comprehensive for all operating conditions of the server. A series of benchmarks can be used for this purpose that represent typical applications that will execute on the server or specialized benchmarks that exercise particular features or components of the server. It will be appreciated that if an exact match is found in the table then the distance from the sample to the match in the table is zero. If this is the case the exact match power value is used and the calculation is not performed in order to avoid division by zero.

Power Estimation

In certain embodiments, the power and/or energy consumption of a server is estimated for a given time period by measuring the power model parameters for this period to obtain a sample value of the parameters. The Cartesian distance of this sample with every entry in the power model table is then computed. If the sample has parameter values ($Par_{1sample}$, $Par_{2sample}$, $Par_{3sample}$) and an entry in the table is designated ($Par_{1entry}$, $Par_{2entry}$, $Par_{3entry}$).

$$\text{Cartesian Distance} = [(Par_{1entry} - Par_{1sample})^2 + (Par_{2entry} - Par_{2sample})^2 + (Par_{3entry} - Par_{3sample})^2]^{1/2}$$

The ten nearest entries are then selected to form a Power weighted average estimate of the sample value according to the formula:

$$\text{Weighted Average} = \frac{\sum Power_i/(Dist_i)^2}{\sum 1/(Dist_i)^2} \quad i = 1 \text{ to } 10,$$

where $Dist_i$=Cartesian Distance from $Entry_i$ to Sample Value. This weighted average ensures that the nearest entries have greater influence in the overall result.

Additional Aspects of the Power Models

In certain embodiments of the invention, power model tables are used as a substitute for, or replacement of, linear equations for power estimation. Advantageously, this approach can eliminate the need to find a best-fit power linear equation using linear regression techniques. Furthermore, this table approach implicitly has multiple linear equations in its structure indexed by O/S parameters and, consequently, it is more accurate.

In addition to power models of components, power models can be generated for O/S functions such as file transfers, network accesses, context switching and scheduling in a similar process as for hardware components. Power models in GA for O/S functions can be generated by activation code which invokes repeatedly the appropriate O/S function. Power models can also be generated at different ambient client temperature so that temperature dependent power models can be used.

Mode of Operation

Figure 2:
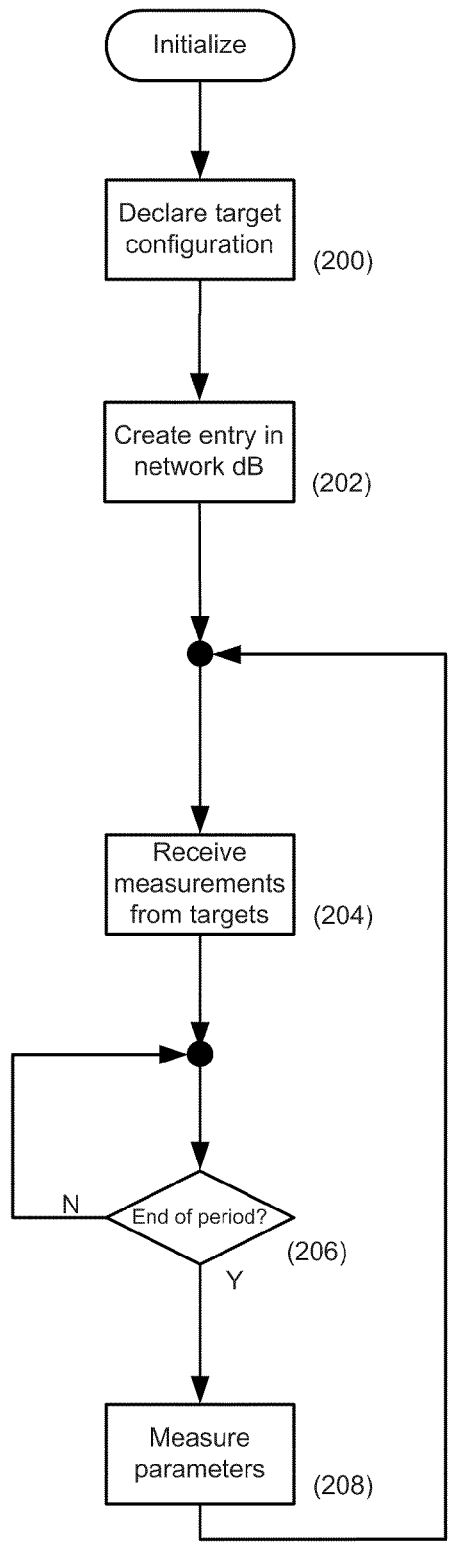
FIG. 2 is a flowchart showing and overview of certain processes performed according to certain aspects of the invention.

FIG. 2 is a simplified process illustrating certain operational aspects of the invention. In certain embodiments, an initialization stage 200 requires a configuration of the target or client computer system to be declared. The configuration details may indicate the server-type of the target and other details such as the identity of the rack and position in which the target server is resident, and the type and version of O/S and other software installed on it. At 202, the identity of every client and its configuration can be stored in a network database 18 (see FIG. 1), At 204, target servers 11-14 communicate with the Master Server 10. Communication can be accomplished using a representational state transfer ("REST") architecture based on the HTTP protocol. Clients can be identified by their internet protocol ("IP") address and accessed via the World Wide Web or other network.

In certain embodiments, the initialization stage also includes installation of daemons 16 on each target server 10-14 that will periodically monitor 208 all power parameters required by the power models through O/S system calls. These daemons typically remain dormant and become active at the end of every sample period 210. The daemons are dormant apart from the time at the end of a time period (see 206) when the daemons sample values at 208 and transmit the information to a designated Master Server 10. Relative to the sample time period this can be a very short active time frame, and consequently ensures that the computational impact on the client server is negligible.

In certain embodiments, during normal operation, each of the target server 11-14 create a packet of power information at the end of a sample time period. This Power-Data packet is communicated to a designated Master Server in the network. The packet amongst other information may comprise:

Target server identity.
Fields for each power parameter in each sample.
Time of sample.
The time period for the sample (i.e., the time over which the sample was taken), if a default value is not used.

Target server temperature, if default not used.

The Master Server 10, using the identity of the target server 11-14 can access the network database 18 and determine the server-type of each target server 11-14. Having identified the server-type, the Master Server 10 invokes the appropriate power-model with the power parameters in the power-data packet. Thus the power and energy consumption for every client and all time intervals can be computed by the Master Server 10 and recorded in the power-profile database with additional information such as time and date of measurement. This enables a complete history of the power and energy consumption of a server 10-14 to be generated and stored in database 17, 18 or 19. Certain of these measurements may be designated as benchmark measurements that can be used to estimate power consumption in similar servers 10-14. Typically, all power computations are performed by the Master Server.

When information detailing the application(s) that were executing and the data activity during a time interval are included in the power-data packet, this information can also be stored in the power-profile data-base. This enables energy/power profiles of various applications to be generated and stored in a database 17. In one example the power component database 19 may be updated based on entries in the power profile database 17.

Profiles are particularly useful in certain embodiments, particularly where a user may wish to search the database of profiles for a particular application and compare the power consumption of this application on different servers. Additionally, an application profile can be stored in the power-profile database 17 in terms of its parameters, so that different power estimations can be calculated for different target servers apart from that of the current target server 11-14.

Automatic Power Model Re-Calibration

In certain embodiments, the Cartesian distance of the ten nearest neighbors to a sample value can be used to form a threshold metric that indicates the likelihood of an error in excess of a nominal value (by default taken to be 2%) in the estimated power value of the sample value. If the sum of the Cartesian distances from the sample value are above a given threshold value, then the Master Server 10 may consider the power estimate to be in excess of an acceptable error, and mark the computed value as "unacceptable" in the power profile database 17. These sample values correspond to operations of the target servers 11-14 that are not adequately covered by their server power models maintained by Master Server 10 and represent conditions for which updates to the power-models may be required.

In order to update a particular power mod& the Master Server 10 typically provides a recalibration computer system with power-model parameter values and server-type information corresponding to an "unacceptable" power estimate detected by the Master Server 10. The recalibration computer system typically has access to a server of the type referenced by the Master Server 10 connected to a power meter to measure real power consumption of the server for the parameter values provided. Benchmark programs with parameter values set in the vicinity of those which gave the error are executed on a server of the same server-type on the recalibration computer system. Several new entries and associated power values are measured and sent to update the power-model maintained by the Master Server 10 which highlighted the original error and additionally all Masters in different organizations that have a copy of the same power model.

This automatic power model recalibration process identifies potentially deficient power models, the operating conditions which may cause these deficiencies. Actual power consumption can be determined for these conditions and updates of all copies of the power-model maintained on different Master Servers 10 can be made using the REST architecture. When a Master Server 10 receives updates, it may augment the appropriate power-model with these new entries and may correct the power values in the power profile database 17 that have been marked "unacceptable" using the actual power value. After several iterations of this process all copies of a given power model have been updated with the collective experience of all users of the model.

Application Power Profiling of Applications

In certain embodiments, an agent on a target server can be modified so that, in addition to sending various system-level parameters used by the Master Server 10 to compute the power consumption of a server over a given time interval, it also sends details of the processes (applications) that executed in the interval and the CPU and memory usage, etc., that each process consumed. This permits the Master Server 10 to provide a break-down of the power consumed by each individual process for each interval.

The Master Server 10 can compute the power consumed by a process using a simple model such as dividing the CPU usage of the process by the total CPU processing time in the interval and multiplying this ratio by the total power consumed. In some embodiments, the power consumed by the process can be calculated using the power model technique with parameter values configured specifically to a desired process.

The process details on each target server 11-14 are obtained by causing the target server 11-14 to execute system-level commands in the O/S which list or enumerate the processes that have executed over the previous time interval. The target may edit these lists to extract the process identities and their resource usage such as CPU, memory, etc., before sending the information to the Master Server 10.

Figure 4:
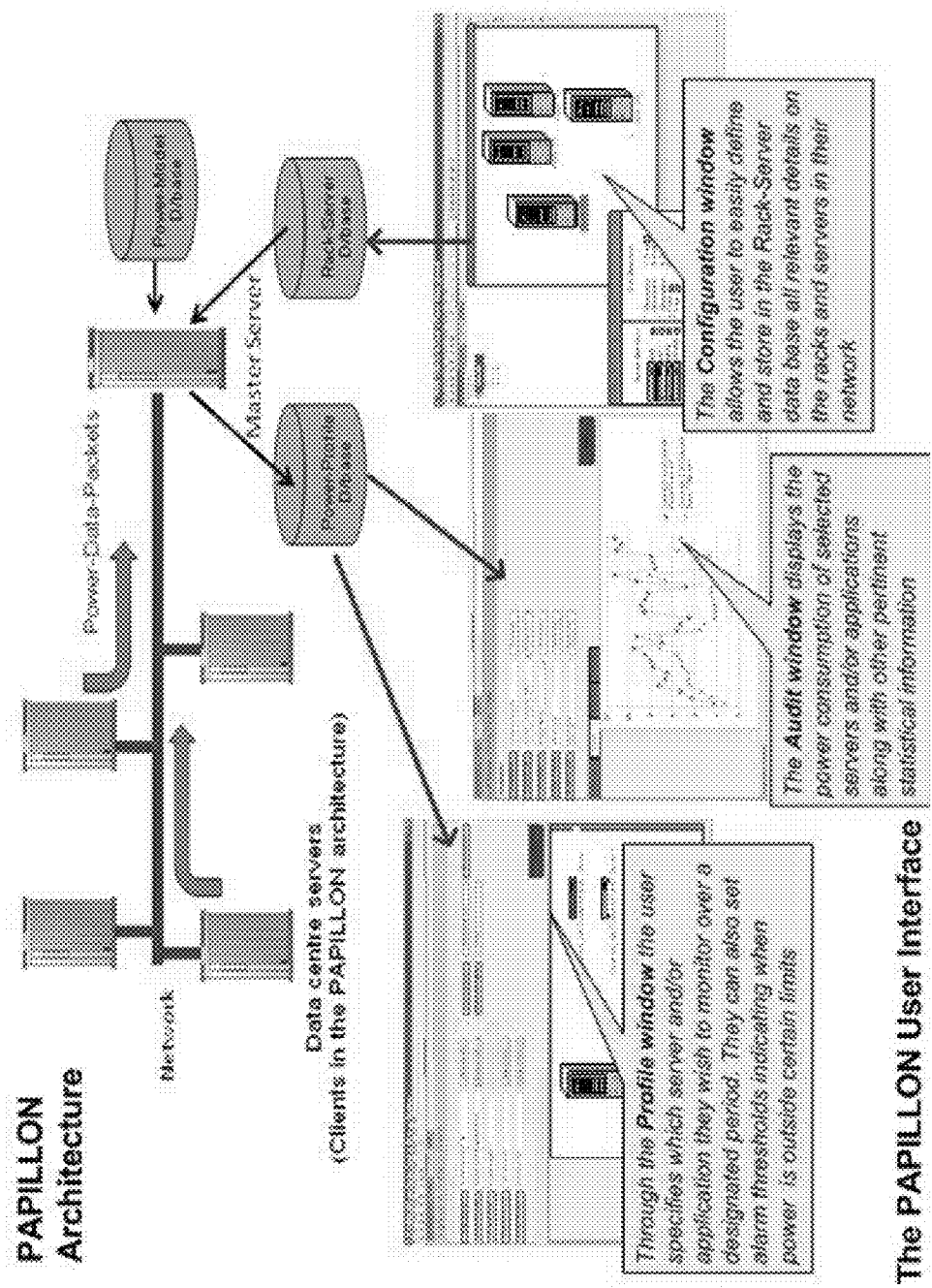
FIG. 4 illustrates the mapping of system operations to a user interface.
Figure 5:
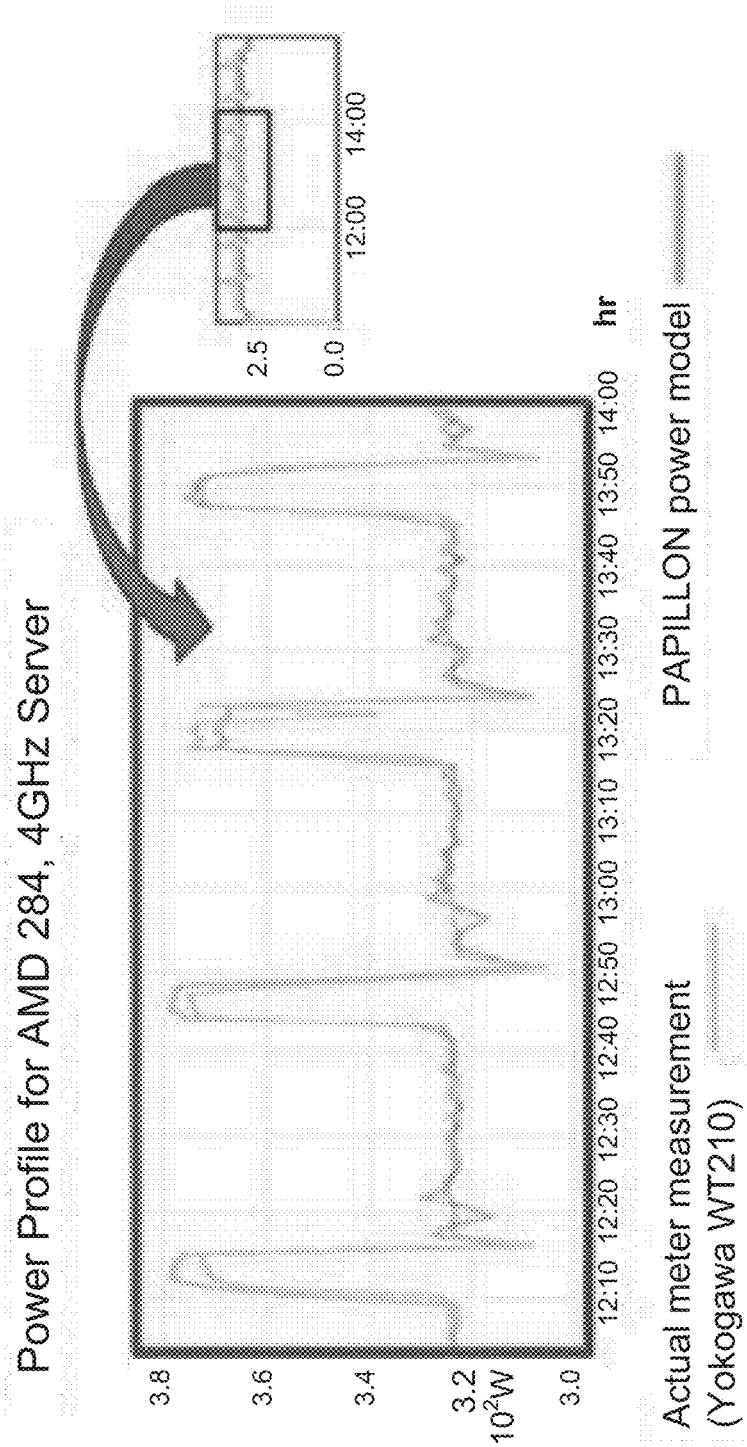
FIG. 5 depicts a graphical representation of power consumption provided through a user interface in certain embodiments of the invention.
Figure 6:
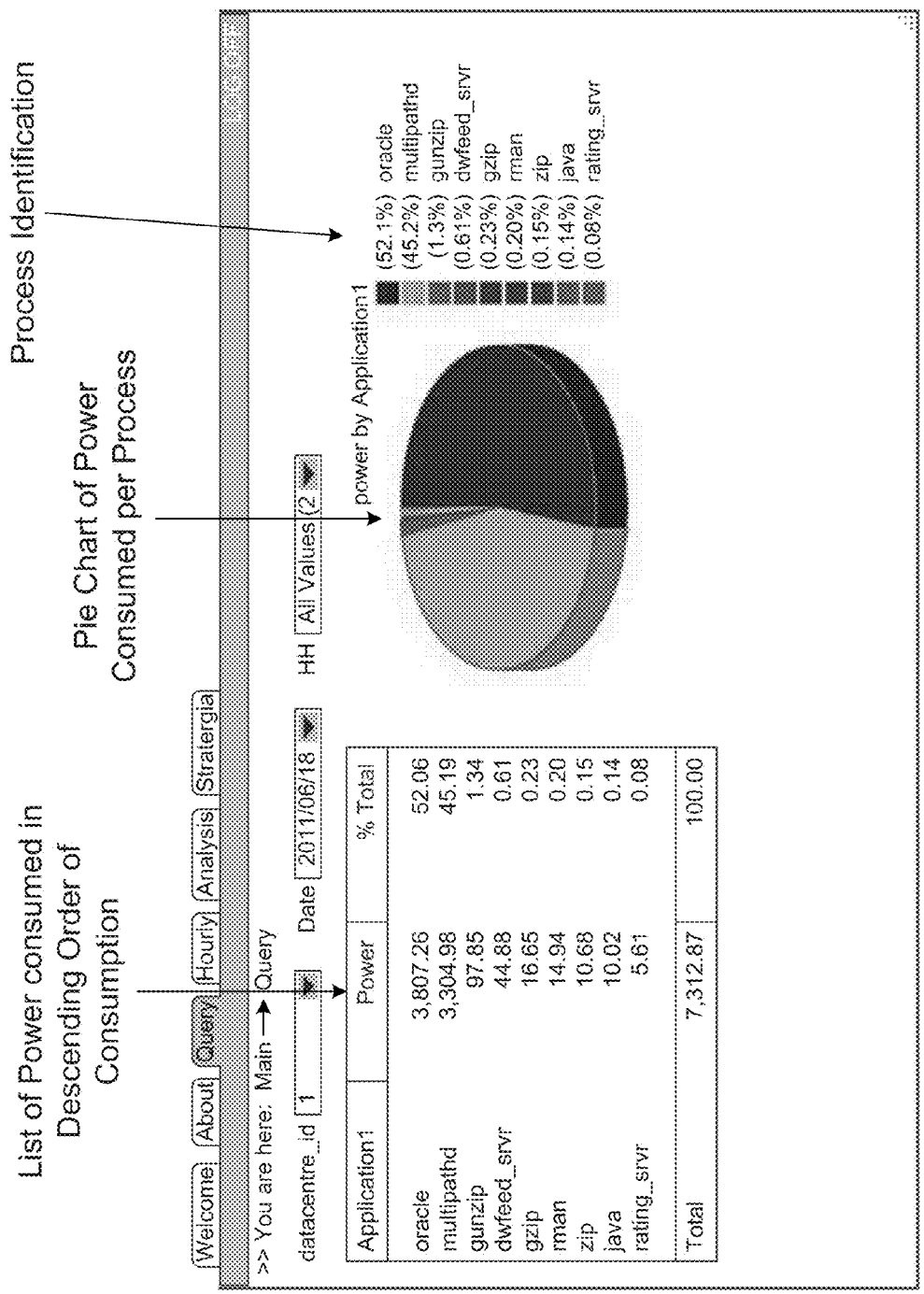
FIG. 6 illustrates a cost analysis illustrating the effect of performance efficiencies on total cost of operation of a server.

When the Master Server 10 receives the power and process information, it can determine the power consumed by the processes for a given interval on a particular server and store this information in a database for future reference. The Master Server 10 can also display the information in a graphical user interface ("GUI"), illustrated in FIGS. 4-6, and can display the power consumed by the processes over any time frame, including durations of a minute, an hour, a day, a week, etc.

Error Detection in the Power Calculation Model

In certain embodiments, when a power calculation has been made by the Master Server 10 using the disclosed power method, the Master Server 10 can check if the value is most likely to have an error that is greater than a predefined threshold or acceptable level. For example, the Master Server 10 may use two calculations in this determination:

a. Calculate if the sum of the Cartesian distances between the sampled parameters made by the client, and the nearest entries in the power table used in the power calculation is greater than a given threshold.

b. Calculate the standard deviation of all the entries in the power table used in the power calculation, and determine if it is above a given threshold.

These calculations can be used to tag calculated entries as being potentially in error in the master database, which can subsequently be corrected by recalibrating the power models using measured power values obtained from a meter.

Operation in a Virtualized Environment

Figure 7:
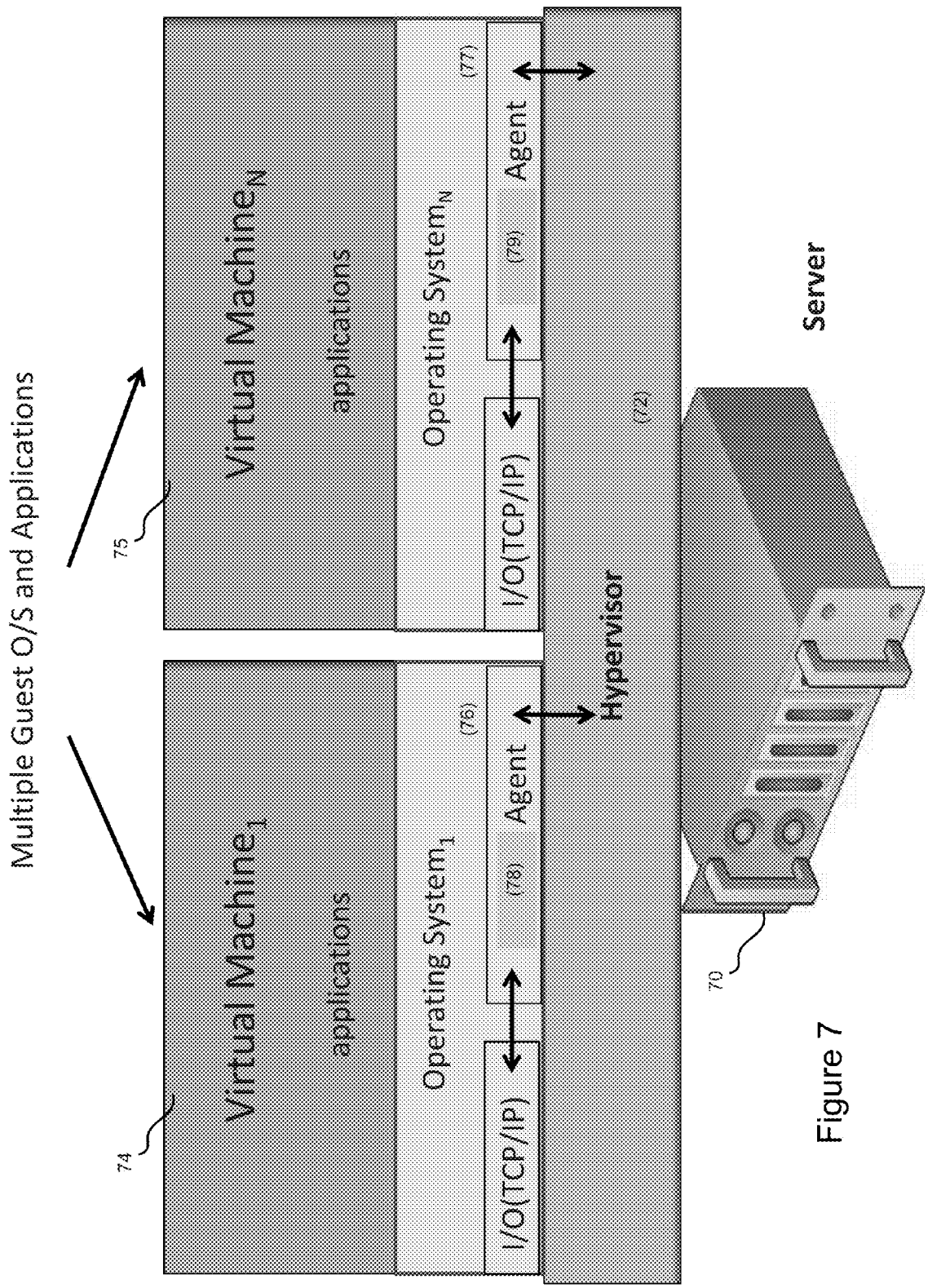
FIG. 7 illustrates a detail user interface display of power consumption allocated by application.

FIG. 7 depicts certain aspects of a virtualized environment comprising a physical server 70 that supports two or more virtualized target servers 74, 75. In a virtualized system, a hypervisor 72 typically provides a thin layer above the physical server 70 in which multiple O/S's 76-77 can be resident. Each guest O/S 76-77 presents an environment, a virtual machine 74-75, to its users and applications in which the hypervisor 72 is transparent. According to certain aspects of the invention, a target agent 78, 79 is installed in each guest O/S 76, 77, as in the case of the single O/S environment on a server (see FIG. 1). However, the guest O/S 76, 77 in a virtualized environment is given additional system call facilities related to the hypervisor 72. The guest O/S 76, 77 can request information on various hypervisor actions through these facilities, including the physical allocation of resources on server 70 to the virtual machines 74, 75. This information may be transmitted with data that the target agent 78, 79 sends periodically to the Master Server 10. The Master Server 10 receives the data from each virtualized target server 74, 75, enabling it to calculate the power consumption of the virtualized target servers 74, 75. However, the parameter values received from virtualized servers 74, 75 must typically be scaled appropriately so that the relative allocation or use of resources, such as CPU usage, network I/O, etc., is converted into absolute values before being used directly in the corresponding server power models. The scaling of parameters may be regulated by the information extracted from the hypervisor 72 by the target agent.

Figure 3:
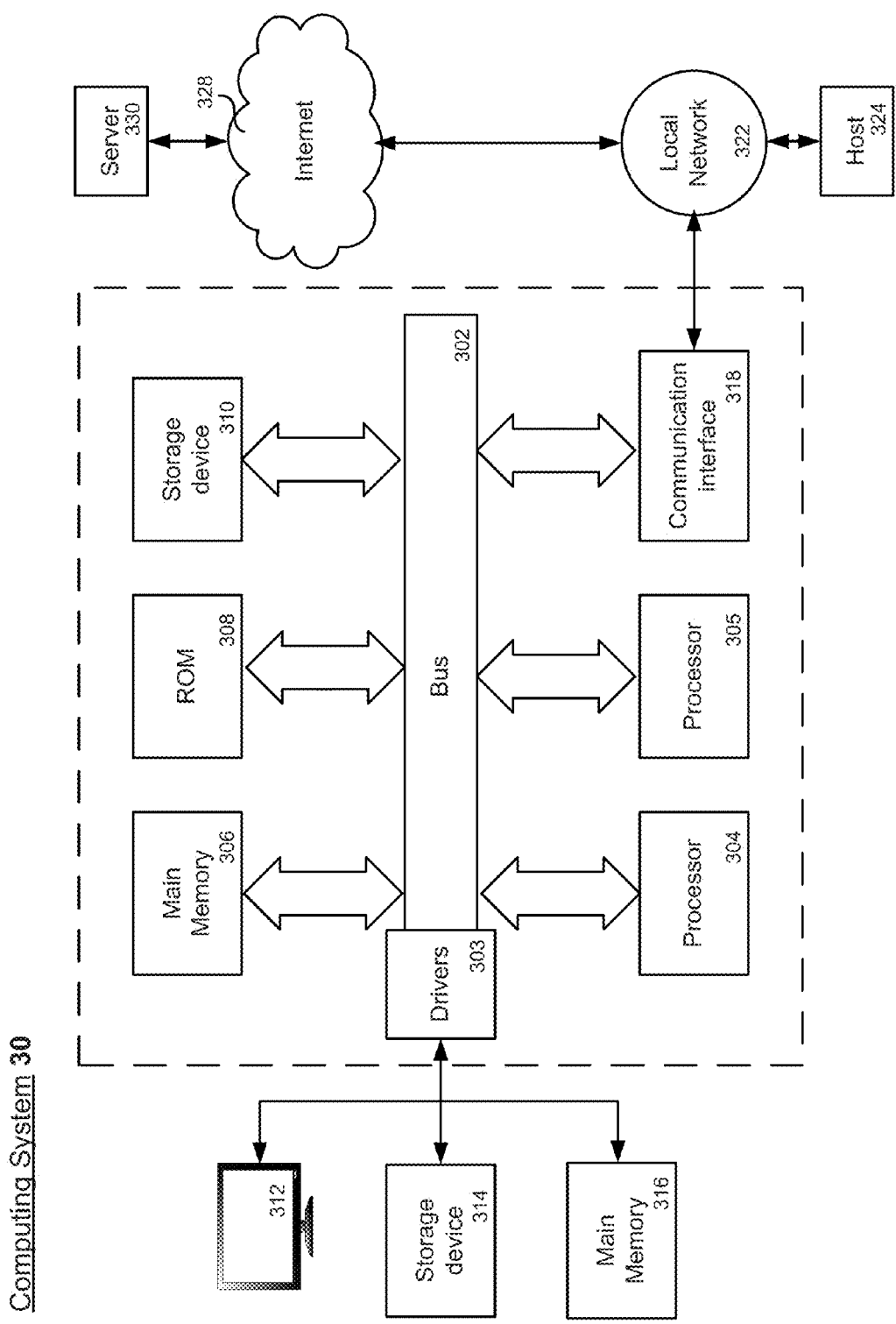
FIG. 3 is a simplified block schematic illustrating a processing system employed in certain embodiments of the invention.

Since every virtual machine has its own agent, this permits the power consumption of every individual virtual machine to be determined. Furthermore, since each agent operates in an environment which ostensibly is the same as a single O/S on a single processor, all of the functions of the client are still preserved, so that the client can still transmit to the master, details on the applications executing in the virtual machine such as their CPU usage, memory usage etc. Therefore, the power consumption of each application in the virtual machine can be traced, System Description Turning now to FIG. 3, certain embodiments of the invention employ servers 10-15 that comprise at least one computing system 300 deployed to operate and perform certain of the steps described above. Computing systems may be a commercially available system that executes commercially available operating systems such as Microsoft Windows®, UNIX or a variant thereof, Linux, a real time operating system and or a proprietary operating system. The architecture of the computing system may be adapted, configured and/or designed for integration in the processing system, for embedding in one or more of an image capture system, a manufacturing/machining system, a graphics processing workstation and/or a general purpose computing. In one example, each computing system 300 comprises a bus 302 and/or other mechanisms for communicating between processors, whether those processors are integral to the computing system 30 (e.g. 304, 305) or located in different, perhaps physically separated computing systems 300. Device drivers 303 may provide output signals used to control internal and external components Computing system 300 also typically comprises memory 306 that may include non-transitory storage such as random access memory ("RAM"), static memory, cache, flash memory and any other suitable type of storage device that can be coupled to bus 302. Memory 306 can be used for storing instructions and data that can cause one or more of processors 304 and 305 to perform a desired process. Main memory 306 may be used for storing transient and/or temporary data such as variables and intermediate information generated and/or used during execution of the instructions by processor 304 or 305. Computing system 300 also typically comprises non-volatile storage such as read only memory ("ROM") 308, flash memory, memory cards or the like; non-volatile storage may be connected to the bus 302, but may equally be connected using a high-speed universal serial bus (USB), Firewire or other such bus that is coupled to bus 302. Non-volatile storage can be used for storing configuration, and other information, including instructions executed by processors 304 and/or 305. Non-volatile storage may also include mass storage device 310, such as a magnetic disk, optical disk, flash disk that may be directly or indirectly coupled to bus 302 and used for storing instructions to be executed by processors 304 and/or 305, as well as other information.

Computing system 300 may provide an output for a display system 312, such as an LCD flat panel display, including touch panel displays, electroluminescent display, plasma display, cathode ray tube or other display device that can be configured and adapted to receive and display information to a user of computing system 300. Typically, device drivers 303 can include a display driver, graphics adapter and/or other modules that maintain a digital representation of a display and convert the digital representation to a signal for driving a display system 312. Display system 312 may also include logic and software to generate a display from a signal provided by system 300. In that regard, display 312 may be provided as a remote terminal or in a session on a different computing system 300. An input device 314 is generally provided locally or through a remote system and typically provides for alphanumeric input as well as cursor control 316 input, such as a mouse, a trackball, etc. It will be appreciated that input and output can be provided to a wireless device such as a PDA, a tablet computer or other system suitable equipped to display the images and provide user input.

Processor 304 executes one or more sequences of instructions. For example, such instructions may be stored in main memory 306, having been received from a computer-readable medium such as storage device 310. Execution of the sequences of instructions contained in main memory 306 causes processor 304 to perform process steps according to certain aspects of the invention. In certain embodiments, functionality may be provided by embedded computing systems that perform specific functions wherein the embedded systems employ a customized combination of hardware and software to perform a set of predefined tasks. Thus, embodiments of the invention are not limited to any specific combination of hardware circuitry and software.

The term "computer-readable medium" is used to define any medium that can store and provide instructions and other data to processor 304 and/or 305, particularly where the instructions are to be executed by processor 304 and/or 305 and/or other peripheral of the processing system. Such medium can include non-volatile storage, volatile storage and transmission media. Non-volatile storage may be embodied on media such as optical or magnetic disks, including DVD, CD-ROM and BluRay. Storage may be provided locally and in physical proximity to processors 304 and 305 or remotely, typically by use of network connection, Non-volatile storage may be removable from computing system 304, as in the example of BluRay, DVD or CD storage or memory cards or sticks that can be easily connected or disconnected from a computer using a standard interface, including USB, etc. Thus, computer-readable media can include floppy disks, flexible disks, hard disks, magnetic tape, any other magnetic medium, CD-ROMs, DVDs, BluRay, any other optical medium, punch cards, paper tape, any other physical medium with patterns of holes, RAM, PROM, EPROM, FLASH/EEPROM, any other memory chip or cartridge, or any other medium from which a computer can read.

Transmission media can be used to connect elements of the processing system and/or components of computing system 300. Such media can include twisted pair wiring, coaxial cables, copper wire and fiber optics. Transmission media can also include wireless media such as radio, acoustic and light waves. In particular radio frequency (RF), fiber optic and infrared (IR) data communications may be used.

Various forms of computer readable media may participate in providing instructions and data for execution by processor 304 and/or 305. For example, the instructions may initially be retrieved from a magnetic disk of a remote computer and transmitted over a network or modem to computing system 300. The instructions may optionally be stored in a different storage or a different part of storage prior to or during execution.

Computing system 300 may include a communication interface 318 that provides two-way data communication over a network 320 that can include a local network 322, a wide area network or some combination of the two. For example, an integrated services digital network (ISDN) may used in combination with a local area network (LAN). In another example, a LAN may include a wireless link. Network link 320 typically provides data communication through one or more networks to other data devices. For example, network link 320 may provide a connection through local network 322 to a host computer 324 or to a wide are network such as the Internet 328. Local network 322 and Internet 328 may both use electrical, electromagnetic or optical signals that carry digital data streams.

Computing system 300 can use one or more networks to send messages and data, including program code and other information. In the Internet example, a server 330 might transmit a requested code for an application program through Internet 328 and may receive in response a downloaded application that provides for the anatomical delineation described in the examples above. The received code may be executed by processor 304 and/or 305.

Figure 8:
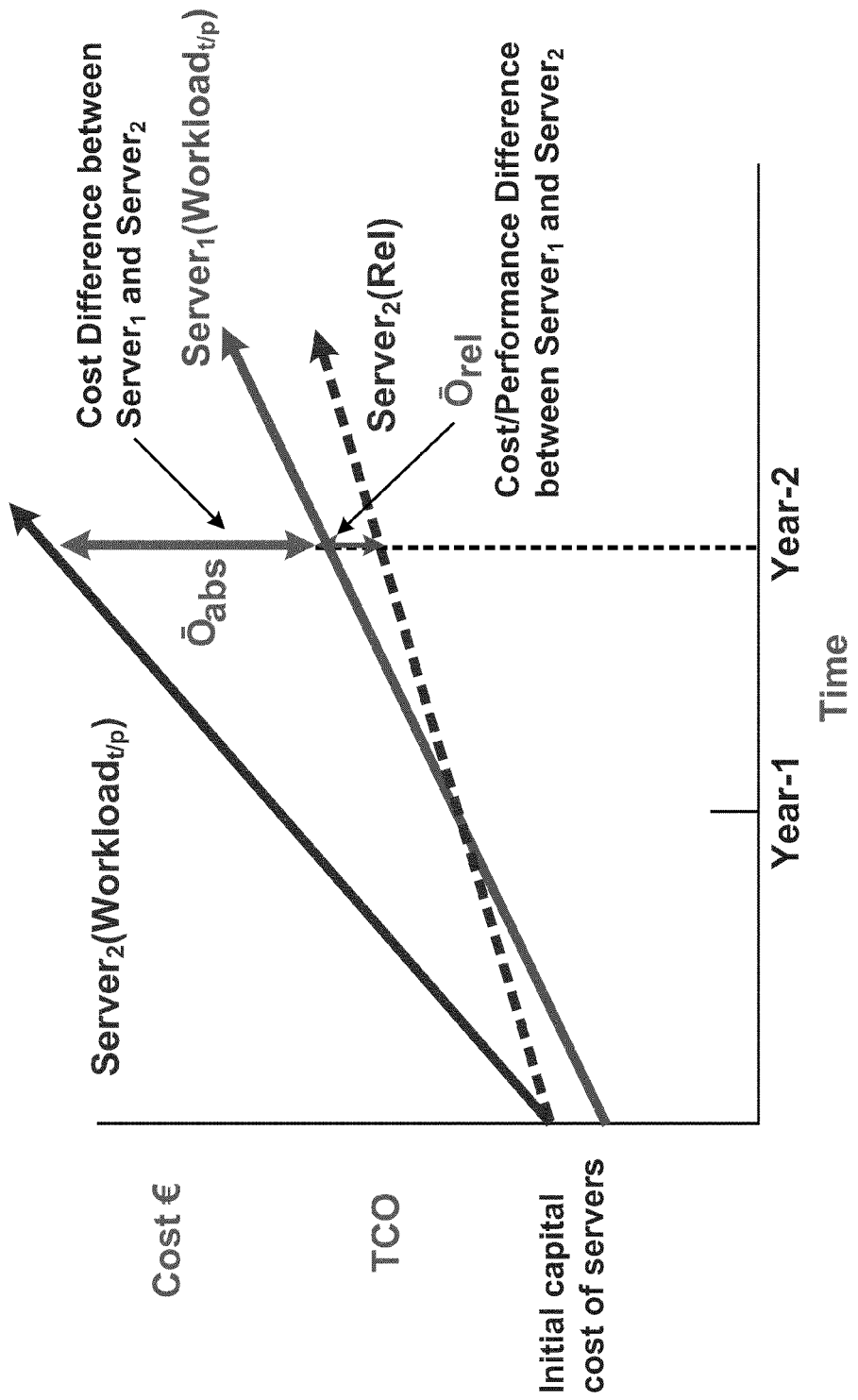
FIG. 8 illustrates an embodiment based on virtual machines.

Example of FIG. 8

Targets included two servers:

Server1: Pentium-4 3 GHz, 1 kbyte cache, 1 Gbyte RAM, cost € 1000.

Server2: AMD 284, 4 GHz, 2 kByte cache, 2 Gbyte RAM, cost € 1100.

During testing, it was established by embodiments of the present invention that the average power consumption for the typical application was 586 W for Server1 and 980W for Server2.

Extrapolating over a 2 year period, the total cost of operation would be € 2309 for Server1 and € 3480 for Server2. Therefore $\delta_{abs}$ is € 1171. However, taking into account computational performance (Server2 is € 1.98 times faster), and its power consumption, Server2 is more economical, since $\delta_{rel}$ is € 189. If two Server1 machines are purchased to get the same performance as Server2, the cost of this strategy over a 2 year period would have been € 2309×2=€ 4618, in contrast to the cost of Server2 (€ 3480).

This analysis shows that the more "expensive" machine is actually 32.7% more cost-effective, a saving of € 1,138 on 2 machines over a 2 year period. If, cooling and space costs are factored in the savings can be even more considerable.

Additional Descriptions of Certain Aspects of the Invention

The foregoing descriptions of the invention are intended to be illustrative and not limiting. For example, those skilled in the art will appreciate that the invention can be practiced with various combinations of the functionalities and capabilities described above, and can include fewer or additional components than described above. Certain additional aspects and features of the invention are further set forth below, and can be obtained using the functionalities and components described in more detail above, as will be appreciated by those skilled in the art after being taught by the present disclosure.

Certain embodiments of the invention model servers and data-center equipment as a black-box entity. Power consumption can be determined in terms of the input and output activity and possibly the state of major components in the server and/or other equipment. The activity and state of devices is typically extracted through an operating system ("O/S") that controls or monitors a device of interest. For example, an O/S can generally describe the state of a computing device on which it is installed and executed and may additionally be able to query peripheral devices, including network interfaces, disk arrays, display and input/output systems, and so on. Moreover, in certain embodiments, nearby devices can be queried for operational and performance characteristics; for example, network routers and switches can often be configured to report status and other information using simple network management protocol (SNMP) or other network management protocols.

Certain embodiments may incorporate and improve upon various standard protocols such as SNMP. These are sometimes termed agent-less power monitoring systems even though an agent on a client device is necessary to perform the SNMP protocol. The SNMP protocol can enables a Master Server to interrogate target servers for physical information regarding the client's behavior through various variables and counters. The basic and limited information available through SNMP may be used to augment or otherwise support the embodiments described herein. It may be possible to use SNMP to derive simple power models for some device such as devices that perform limited functions. Such simple power models are typically linear in CPU or memory usage, and SNMP and similar protocols are generally not capable of delivering details on software aspects of the server, including O/S information such as which processes have executed and the individual resource allocation details regarding these processes.

SNMP and such protocols are further limited with respect to virtualized servers because SNMP is deficient in determining the power consumption of individual Virtual Machines, Details of virtualization and partitioning of physical server resources among the guest O/S's can change dynamically and typically cannot be extracted through these protocols. Accordingly, certain embodiments rely on the agent described herein to provide access to the detailed information necessary for power management.

In certain embodiments, power may be modeled at a level of abstraction above the physical parameters that are directly influenced by, or that affect power consumption. While sensors located external to the devices in the network can be monitored, their use is not required and many embodiments of the invention do not use sensors under normal operational conditions.

Certain embodiments provide a high degree of granularity of power consumption by devices in a network or system being monitored. Individual servers, blades/cards in a rack and/or applications can be monitored separately. According to certain aspects of the invention, power consumption attributable to individual virtual machines can be estimated through the operating system of a hosting server.

In certain embodiments of the invention potentially erroneous power values can be detected using a power model. In one example, statistics of the measured values in the table can be used to set one or more thresholds, above which a calculated power value is most likely to have an error larger than a given margin.

Certain embodiments of the invention perform power calculations using a central server. Data can be transmitted by agents on each of a plurality of target servers, and the target server may be a virtualized server. The agent is typically embedded in the guest kernel (of a hosted virtual machine). The same parameters can be extracted by monitoring agents in guest kernels and non-virtual servers. The agent in a virtual machine may use additional system calls to the O/S pertinent to the resource allocation made to the virtual machine by a hypervisor. This information may also be sent to the master by the client. With this information the master is able to ascertain which percentage of the physical resources, CPU usage etc, has been allocated to each virtual machine. Thus, the O/S parameters of each virtual machine can be scaled and used in the normal power model of the server and the actual power consumption of each virtual machine calculated. Once the individual power consumption of a virtual machine is known, the power consumption of each process in the virtual machine can also be determined using the techniques disclosed herein for single O/S systems.

Certain embodiments of the invention provide unique and innovative, comprehensive power management systems and methods. Certain embodiments measure server-level power consumption in real-time. Additional hardware (e.g. meters) is typically not required and the systems are simple and intuitive to use. Certain embodiments can be deployed in systems using Windows, UnixiLinux and other operating systems.

In certain embodiments, benchmarks are used to exercise each server-type, while physical measurements can be made using a meter to produce a mathematical power model of the server. One model per server-type may be maintained. Power model Database is installed on a Master server.

Certain embodiments maintain a configuration of boards, racks and other physical attributes of target servers. Certain agent software installed on target servers is typically dormant 99.99% of the time. In certain embodiments, the Master receives power-data packets from targets and calculates min/max/average statistics for all power parameters in each packet for each server. A datacenter configuration database is typically accessed by the Master after a target's packet has been received and statistics generated. Using configuration details the target's power consumption is determined by the power models of the targets servers. For every packet (i.e. Time interval) the target's power and time of consumption is typically stored by the Master in the power-profile database.

Certain advantages may be accrued using systems constructed according to certain aspects of the invention. For example, accurate daily and strategic analysis of data center performance may be obtained, leading to more efficient capital expenditure and more efficient operating costs. Moreover, increases in server utilization from an average 10-20% (IDC survey) to 80% can lead to lowered resource requirements, more efficient use of PDU's (e.g. 20 to 80%) and increased virtualization. Additionally, access to Power profiles from other users may allow actual power performance to be reviewed in advance of upgrades and provisioning activities. Ultimately, savings in equipment purchased and power consumption can be realized.

Some embodiments of the invention have elements deployed on devices other than servers. For example, the power management and monitoring function, attributed mainly to a Master Server herein, can be performed by a dedicated workstation, desktop computer or other computing device. Accordingly a Master Device may be defined that performs the functions of the Master Server described herein, communicates with the agents on target devices (which also need not be servers), and which may distribute agents to the targets. The Master Device may be embodied in a network management station, a security console or other processing device. However, it is often desirable that power management functions are performed in secured environments.

Certain embodiments of the invention provide systems and methods for estimating power consumption in a network of computing devices. In certain embodiments, the methods are performed by a processor of a primary server. Certain embodiments comprise periodically receiving operational information from a target server. In certain embodiments, the operational information comprises performance data of the target server during a predefined time internal. Certain embodiments comprise comparing elements of the received operational information with corresponding elements from a model of the target server. Certain embodiments comprise identifying a set of elements from the model that most closely corresponds to the elements of the received operational information based on the comparison. Certain embodiments comprise estimating power consumption of the target server during the time interval based on the identified set of elements.

Certain embodiments comprise the performance data includes data describing state of operation of the target server during the time interval. In certain embodiments, the performance data includes system-level data of the target server, including one or more of CPU usage, disk activity and network activity. In certain embodiments, the system-level data includes CPU usage measured as a percentage of time that a processor of the target server is active. In certain embodiments, the system-level data includes disk activity measured as bytes transferred per second. In certain embodiments, the system-level data includes network activity measured as bits transmitted or received every second. In certain embodiments, the system-level data of the target server includes a cache hit/miss rate.

Certain embodiments comprise determining whether an error exists in the estimated power consumption. Certain embodiments comprise recalibrating the model based on the received operational information when an error is detected in estimated power consumption.

In certain embodiments, wherein the performance data is acquired by an agent installed in the target server. In certain embodiments, the target server is a virtualized server. In certain embodiments, the agent acquires at least some of the performance data from a hypervisor of a physical server that hosts the target server.

Certain embodiments of the invention provide systems for estimating power consumption in a network. Certain embodiments comprise a primary server configured to collect performance information from a plurality of target servers, Certain embodiments comprise a database configured to maintain benchmark performance data for different types of server and different configurations of the different types of servers. In certain embodiments, the database is configured to organize the benchmark performance data for each type and configuration of server for a plurality of operational conditions.

In certain embodiments, the primary server estimates energy usage of the plurality of target servers using data extracted from the database based on the type of each target server and its operational conditions during a predetermined time period. In certain embodiments, the plurality of target servers includes a virtualized server. In certain embodiments, an agent is installed on each target server to acquire the performance information from the each target server. In certain embodiments, at least some of the performance information collected from the virtualized server is collected from a hypervisor of a physical server that hosts the target server.

Certain embodiments of the invention provide an agent comprising data and instructions that, when executed by a processor of a target server, cause the target server to perform a method. In certain embodiments, the method comprises acquiring performance data related to the target server upon expiration of a time interval of a predetermined duration. In certain embodiments, acquiring the performance data includes making one or more system calls to the operating system of the target server. In certain embodiments, the method comprises transmitting the performance data to a master server. In certain embodiments, the master server is configured to estimate power consumption of the target server by comparing the performance data to benchmark data maintained by the master server in a model of the target server. In certain embodiments, the method comprises initiating a new time interval of the predetermined duration.

In certain embodiments, the target server is a virtualized server. In certain embodiments, acquiring performance data includes obtaining at least some of the performance data from a hypervisor of a physical server that hosts the target server. In certain embodiments, the performance data includes data describing state of operation of the target server during the time interval.

In certain embodiments, the performance data includes system-level data of the target server. In certain embodiments, the system-level data includes one or more of CPU usage. In certain embodiments, CPU usage is measured as a percentage of time that a processor of the target server is active. In certain embodiments, the system-level data includes disk activity. In certain embodiments, disk activity is measured as bytes transferred per second. In certain embodiments, the system-level data includes network activity. In certain embodiments, network activity is measured as bits transmitted or received every second. In certain embodiments, the system-level data of the target server includes a cache hit/miss rate.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense.

What is claimed is:

1. A method for estimating power consumption in a network of computing devices, the method being performed by a processor of a primary server, the method comprising:
   receiving operational information from a target server and a target server identifier, the operational information comprising parameter values aggregated over a period of time, a time stamp reflecting the end of the time period, and operational state of the target server during a time interval;
   comparing elements of the received operational information with corresponding elements from a model of the target server that is selected in accordance with the target server identifier;
   based on the comparison, identifying a set of elements from the model that most closely corresponds to the elements of the received operational information; and
   estimating power consumption of the target server during the time interval based on the identified set of elements.

2. The method of claim 1, wherein the operational information includes system-level data of the target server, including one or more of central processing unit ("CPU") usage, disk activity and network activity.

3. The method of claim 2, wherein the system-level data includes CPU usage measured as a percentage of time that a processor of the target server is active.

4. The method of claim 2, wherein the system-level data includes disk activity measured as bytes transferred per second.

5. The method of claim 2, wherein the system-level data includes network activity measured as bits transmitted or received every second.

6. The method of claim 2, wherein the system-level data of the target server includes a cache hit/miss rate.

7. The method of claim 2, wherein the system-level data of the target server further comprises processes that have been executed and their use of the CPU, disk activity and network activity.

8. The method of claim 1, further comprising
   determining whether an error exists in the estimated power consumption; and
   when the error is present, recalibrating the model based on the received operational information.

9. The method of claim 1, wherein the operational information is acquired by an agent installed in the target server.

10. The method of claim 9, wherein the target server is a virtualized server.

11. The method of claim 10, wherein the agent acquires at least some of the operational information from a hypervisor of a physical server that hosts the target server.

12. The method of claim 1 further comprising storing the estimated power consumption.

13. A system for estimating power consumption in a network, comprising:
   a primary server configured to collect performance information from a plurality of target servers; and
   a database configured to maintain benchmark performance data for at least one type of server and at least one configuration of each type of server, wherein the database is configured to organize the benchmark performance data for the each type and configuration of server for a plurality of operational conditions,
   wherein the primary server estimates energy usage of the plurality of target servers using data extracted from the database based on the type of each target server and its operational conditions during a predetermined time period, and
   wherein the benchmark performance data for each of the plurality of target servers is accessed using a target server identifier, and
   wherein the primary server is configured to receive, from each target server, parameter values aggregated over a period of time, a time stamp reflecting the end of the time period, and operational state of the each target server during a time interval.

14. The system of claim 13, wherein the plurality of target servers includes a virtualized server.

15. The system of claim 14, wherein an agent is installed on each target server to acquire the performance information from the each target server and wherein at least some of the performance information collected from the virtualized server is collected from a hypervisor of a physical server that hosts the target server.

16. A non-transitory computer readable storage medium having one or more instructions that, when executed by a processor of a target server, cause the processor to:
   acquire parameter values related to the target server upon expiration of a time interval, wherein causing the processor to acquire the parameter values includes causing the processor to make one or more system calls to the operating system of the target server;

aggregate the parameter values over the time interval into performance data;

transmit the performance data to a master server with a time stamp reflecting the end of the time interval and the operational state of the target server during the time interval, wherein the master server is configured to estimate power consumption of the target server by comparing the performance data to benchmark data maintained by the master server in a model of the target server; and initiate a new time interval.

17. The storage medium of claim 16, wherein the target server is a virtualized server.

18. The storage medium of claim 17, wherein causing the processor to acquire parameter values includes causing the processor to obtain at least some of the performance data from a hypervisor of a physical server that hosts the target server.

19. The storage medium of claim 16, wherein the performance data includes system-level data of the target server, including one or more of central processing unit ("CPU") usage measured as a percentage of time that a processor of the target server is active, disk activity measured as bytes transferred per second and network activity measured as bits transmitted or received every second.

20. The storage medium of claim 19, wherein the system-level data of the target server includes a cache hit/miss rate.

* * * * *